United States Patent
Brooks et al.

(10) Patent No.: US 10,065,692 B2
(45) Date of Patent: Sep. 4, 2018

(54) TRACK LINK STRUCTURE AND PIN JOINT ASSEMBLY

(71) Applicant: Caterpillar Inc., Peoria, IL (US)

(72) Inventors: Jennifer Ann Brooks, Germantown Hills, IL (US); Roger Lee Recker, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 24 days.

(21) Appl. No.: 14/825,456

(22) Filed: Aug. 13, 2015

(65) Prior Publication Data
US 2017/0043820 A1    Feb. 16, 2017

(51) Int. Cl.
  *B62D 55/21*    (2006.01)
  *B62D 55/205*   (2006.01)

(52) U.S. Cl.
  CPC ........... *B62D 55/21* (2013.01); *B62D 55/205* (2013.01)

(58) Field of Classification Search
  CPC ...... B62D 55/20; B62D 55/205; B62D 55/21; B62D 55/211; B62D 55/215; B62D 55/213
  USPC .................. 305/196, 198, 200, 201, 202
  See application file for complete search history.

(56) References Cited

U.S. PATENT DOCUMENTS

| | | | |
|---|---|---|---|
| 4,324,437 A | 4/1982 | Narang | |
| 4,423,910 A * | 1/1984 | Narang | B62D 55/20 305/100 |
| 5,183,318 A * | 2/1993 | Taft | B62D 55/32 305/104 |
| 5,829,850 A | 11/1998 | Ketting et al. | |
| 5,887,958 A * | 3/1999 | Bissi | B62D 55/211 305/200 |
| 6,206,491 B1 * | 3/2001 | Hisamatsu | B62D 55/088 305/103 |
| 6,485,116 B1 | 11/2002 | Oertley | |
| 7,661,774 B2 * | 2/2010 | Yamamoto | B62D 55/21 305/187 |
| 7,850,256 B2 | 12/2010 | Mulligan | |
| 8,070,241 B2 | 12/2011 | Mulligan | |
| 8,851,582 B2 | 10/2014 | Grenzi | |
| 2002/0145336 A1 * | 10/2002 | Bottom | B21L 9/08 305/202 |
| 2003/0000747 A1 * | 1/2003 | Sugiyama | B62D 55/211 180/9.1 |
| 2008/0164756 A1 | 7/2008 | Yamamoto et al. | |
| 2012/0002910 A1 * | 1/2012 | Snyder | B21D 53/20 384/371 |

(Continued)

OTHER PUBLICATIONS

Jennifer Brooks et al., U.S. Design Patent Application for a Rail Guide, (5 pages) and 12 pages of drawings (Figs. 1-24); filed Aug. 13, 2015.

*Primary Examiner* — Jason R Bellinger
*Assistant Examiner* — Scott A Browne
(74) *Attorney, Agent, or Firm* — Mattingly Burke Cohen & Biederman (57) ABSTRACT

A track link includes a link body having first and second sides, a rail surface, a shoe engaging surface, and first and second end portions. A link pin bore at the first end portion is configured to receive a link pin. A bushing bore at the second end portion is configured to receive a bushing. A link pin boss is located at the first end portion on the first side and surrounds the link pin bore. A bushing boss is located at the second end portion on the second side and surrounds the bushing bore.

12 Claims, 9 Drawing Sheets

(56) References Cited

U.S. PATENT DOCUMENTS

2013/0241277 A1    9/2013  Giusti
2014/0292068 A1*  10/2014  Hisamatsu ............ B62D 55/21
                                                   305/202

* cited by examiner

TRACK LINK STRUCTURE AND PIN JOINT ASSEMBLY

TECHNICAL FIELD

The present disclosure relates generally to track link structure and, more particularly, to track link structure and a pin joint assembly.

BACKGROUND

Many machines, such as, for example, tractors, dozers, and other earth or material moving machines, include tracked undercarriages to facilitate movement of the machines over ground surfaces. Such undercarriages typically include drive sprockets that drive endless track assemblies about one or more idlers, track rollers, and/or other guiding components to propel the machines over the ground surfaces. Each track assembly generally includes a pair of parallel chains, each made up of a series of links, joined to each other by pins and/or bushings (the combination of which is sometimes referred to as a cartridge assembly). Due to extreme wear from abrasion and impacts experienced during use, these components require substantial maintenance, including replacement of worn parts. Such maintenance may be costly.

One significant area of wear for tracked undercarriages is the area where link pins engage guides. The links may include long pin bosses extending laterally toward the outside of the link chain to form sufficient internal surface area to maintain a press-fit of the link with the link pin. A result of this lateral extension of the long pin bosses is that the link pin ends and the long pin bosses encounter a scraping engagement with the guides. This scraping engagement causes wear both to the guide surfaces and to the ends of the link pins and the laterally extending pin bosses. This in turn may weaken the press-fit connection of the link with the link pin. All of this may increase maintenance costs.

A track chain arrangement is disclosed in U.S. Pat. No. 5,183,318 of Taft et al. (the '318 patent). The '318 patent is one example of a track chain arrangement with links that include lateral extensions on the links providing pin bosses surrounding bores for creating ample surface contact with link pins received in the bores. The track chain arrangement of the '318 patent includes a series of link sets connected together by link pins and bushings mounted coaxially around the link pins. An end of each link includes an outboard end collar that forms a long boss extending laterally toward the outside of the link chain. An end of a link pin is pressed and non-rotatably mounted in a bore through the long boss on the outboard end collar. The '318 patent discloses that an additional mechanical interlock may be formed to further prevent any movement between the link pin and the end collar.

The track chain joint of the '318 patent provides a structure and a link pin assembly that ensures a good connection between the link pins and the link sets, but the structure may be improved. The good connection between a link pin and an associated link in the '318 patent requires a pin boss that extends a substantial distance laterally of the link. In many machines, the track chains are pin guided by guiding structure mounted on the undercarriage of the machine. The substantial lateral extent of the pin boss in the '318 patent may make significant contact with the guiding structure and both unduly wear the link pin end and the pin boss and weaken the connection between the link pin and the link.

The track link structure and pin joint assembly of the present disclosure addresses one or more of the needs set forth above and/or other problems of the prior art.

SUMMARY

In one aspect, a track link includes a link body having first and second sides, a rail surface, a shoe engaging surface, and first and second end portions. The track link also includes a link pin bore at the first end portion configured to receive a link pin, and a bushing bore at the second end portion configured to receive a bushing. A link pin boss is located at the first end portion on the first side and surrounds the link pin bore. A bushing boss is located at the second end portion on the second side and surrounds the bushing bore.

In another aspect, a pin joint assembly includes a first link having a rail surface, a shoe engaging surface, an outer side face and an inner side face, and a first bore extending through a first end portion of the first link. The pin joint assembly also includes a second link having a rail surface, a shoe engaging surface, an outer side face and an inner side face, and a second bore extending through a second end portion of the second link. The first and second bores are axially aligned. A link pin is positioned within the first bore, and a bushing is positioned coaxially around the link pin and within the second bore. A link pin boss is on the outer side face of the first link, and a bushing boss is on the inner side face of the second link.

In another aspect, a pin joint assembly includes a first link having first and second end portions, a rail surface, a shoe engaging surface, and inner and outer side faces. The pin joint assembly also includes a second link having first and second end portions, a rail surface, a shoe engaging surface, and inner and outer side faces. The pin, joint assembly also includes a first bore extending through the first end portion of the first link, and a second bore extending through the second end portion of the second link, the first and second bores being axially aligned. The pin joint assembly also includes a pivotal connection, between the first and second links including a link pin positioned within the first bore, and a bushing positioned coaxially around the link pin and positioned within the second bore. The pin joint assembly also includes a link pin boss on the outer side face of the first link, including an annular protrusion around the first bore on the outer side face of the first link, and a bushing boss on the inner side face of the second link, including an annular protrusion around the second bore on the inner side face of the second link. The pin joint assembly also includes an annular recess on the inner side face of the first link concentric to the link pin and having a diameter approximately equal to the diameter of the bushing and approximately equal to or less than the diameter of the annular protrusion around the first bore. The lateral thickness of the first link from the first side face to the second side face between the annular protrusion of the link pin boss and the annular recess is no greater than the lateral thickness of the first link from the first side face to the second side face measured adjacent the rail surface at the first end portion of the first link.

DETAILED DESCRIPTION

Figure 1:
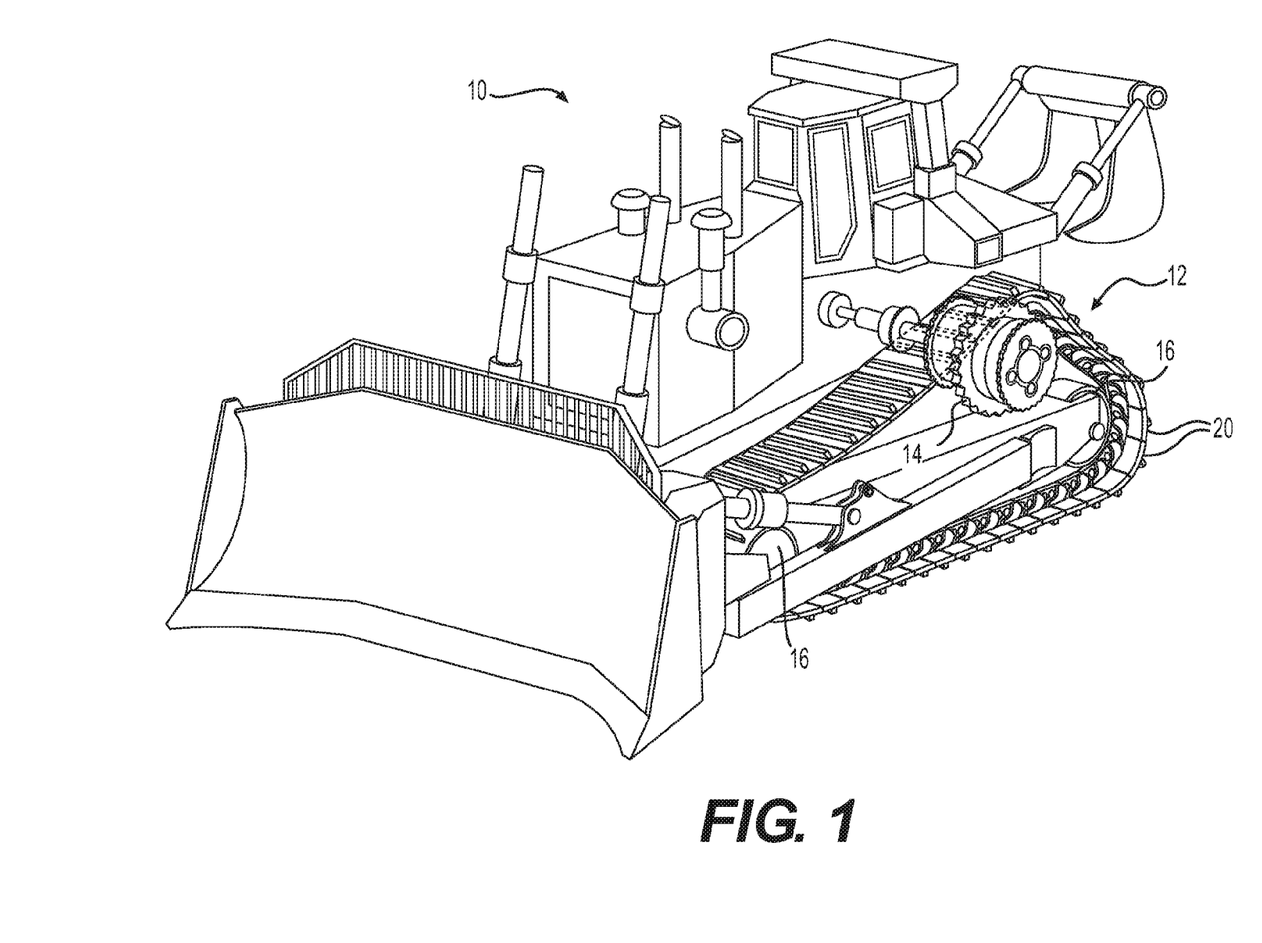
FIG. 1 illustrates an exemplary machine including a tracked undercarriage.

FIG. 1 illustrates an exemplary track-type machine 10. Track-type machine 10 may be a dozer, a tractor, or any type of tracked earth working, earth moving, or other machine. Track-type machine 10 may be propelled via a pair of endless track chains 12, only one of which is shown in FIG. 1. When track-type machine 10 is operated, a drive sprocket 14 may engage endless track chain 12 and drive it about one or more idlers, such as idlers 16, to facilitate movement of track-type machine 10. In addition, one or more track rollers or other guiding components (not shown) may be employed. Endless track chain 12 may include a number of shoes 20 engaged to links of endless track chain 12 for movement over ground surfaces.

Figure 2:
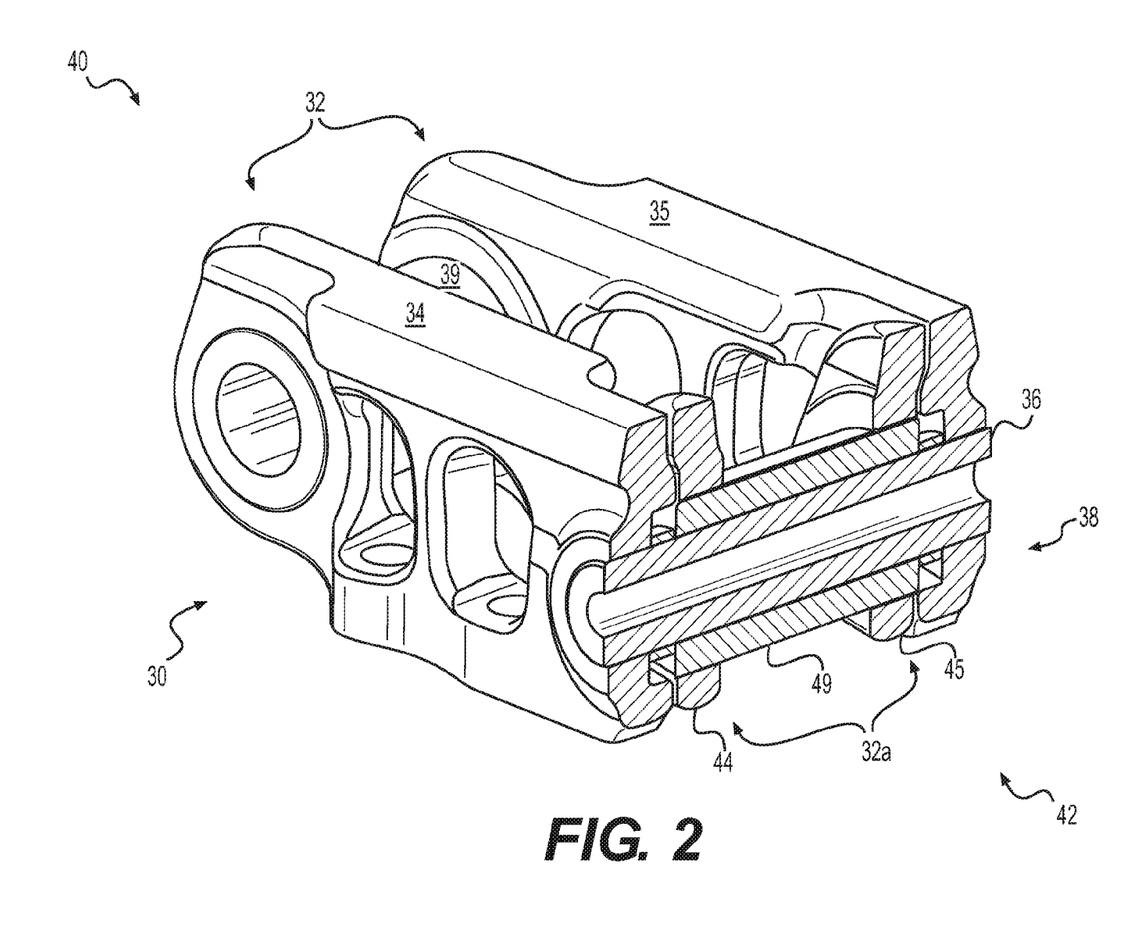
FIG. 2 is a perspective view of a track link structure, in partial cutaway to show detail.

FIG. 2 illustrates exemplary track link structure 30. Track link structure 30 may form a part of an endless track chain 12 (FIG. 1) for any track-type machine, such as track-type machine 10 of FIG. 1. Track link structure 30 may include a track link set 32, with the track link set 32 including two track links 34, 35 connected to each other by a link pin 36 at a first end portion 38, and connected to each other by a bushing 39 at a second end portion 40. Track link structure 30 also may include other track link sets interconnected to track link set 32 in end-to-end arrangement. For example, FIG. 2 illustrates a second end portion 42 of another track link set 32a that includes two track links 44 and 45 connected to each other by bushing 49 mounted concentrically around link pin 36 of track link set 32. It should be understood that one track link set may be connected to another track link set in this same fashion until a sufficient number of track link sets are interconnected to form an endless track chain 12 of sufficient size for a particular track-type machine 10.

Track links 34 and 44 are substantially identical to each other. In other words, second end portion 40 of track link set 32 is substantially identical to second end portion 42 of track link set 32a, and first end portion 38 of track link set 32 is substantially identical to a first end portion of track link set 32a that is not shown in FIG. 2. The cutaway cross-sectional view in FIG. 2 illustrates a first end portion 38 of track link 34, and a second end portion 42 of track link 44. Similarly, track links 35 and 45 are substantially identical to each other, the cutaway cross-sectional view in FIG. 2 illustrating a first end portion 38 of track link 35, and a second end portion 42 of track link 45. The two track links of a track link set (i.e., track links 34 and 35 are one track link set, and track links 44 and 45 are another track link set) are substantial mirror images of each other (e.g., one may be characterized as left-handed, and the other as right-handed).

Figure 3:
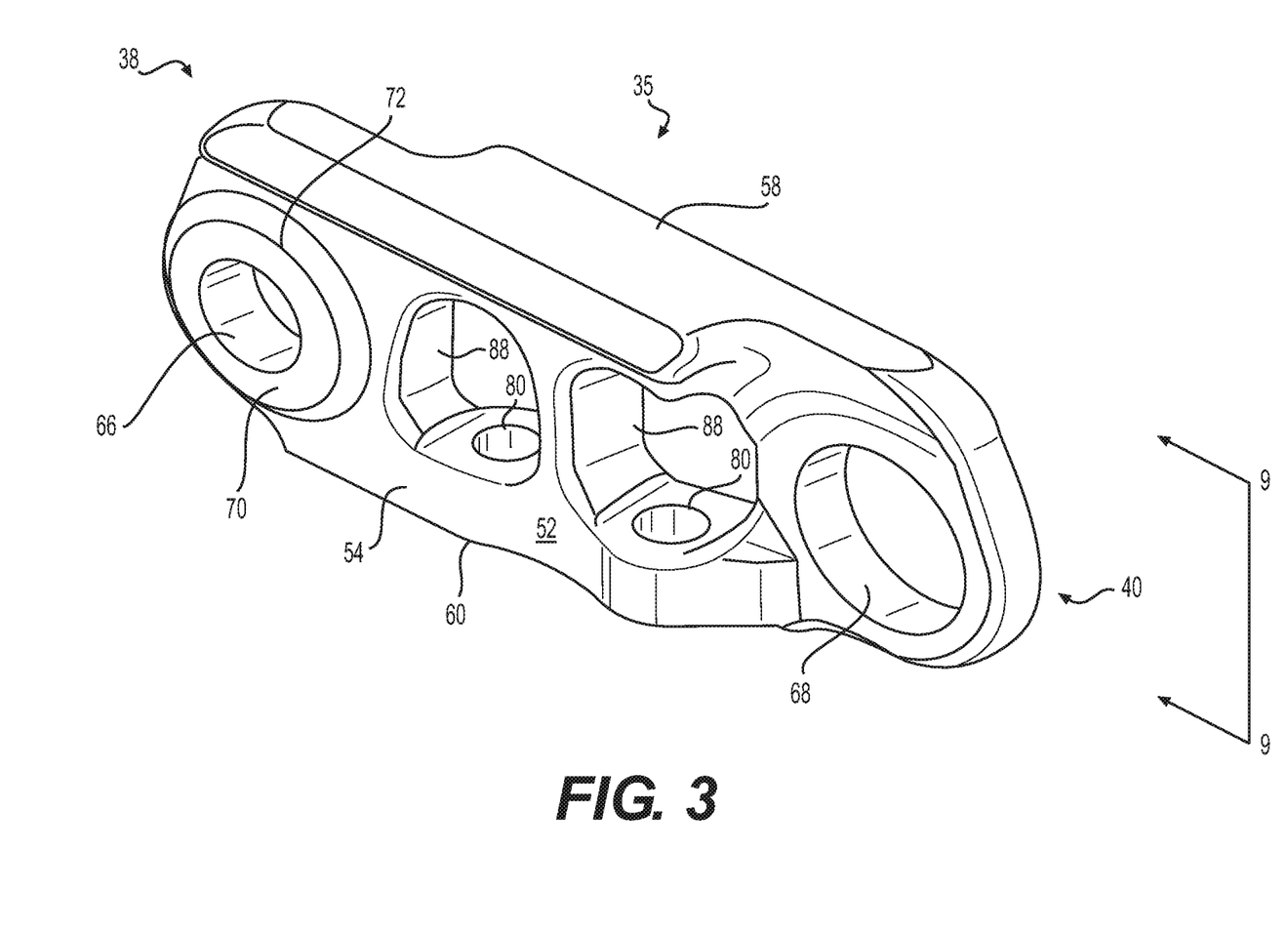
FIG. 3 is a perspective view of a track link.
Figure 4:
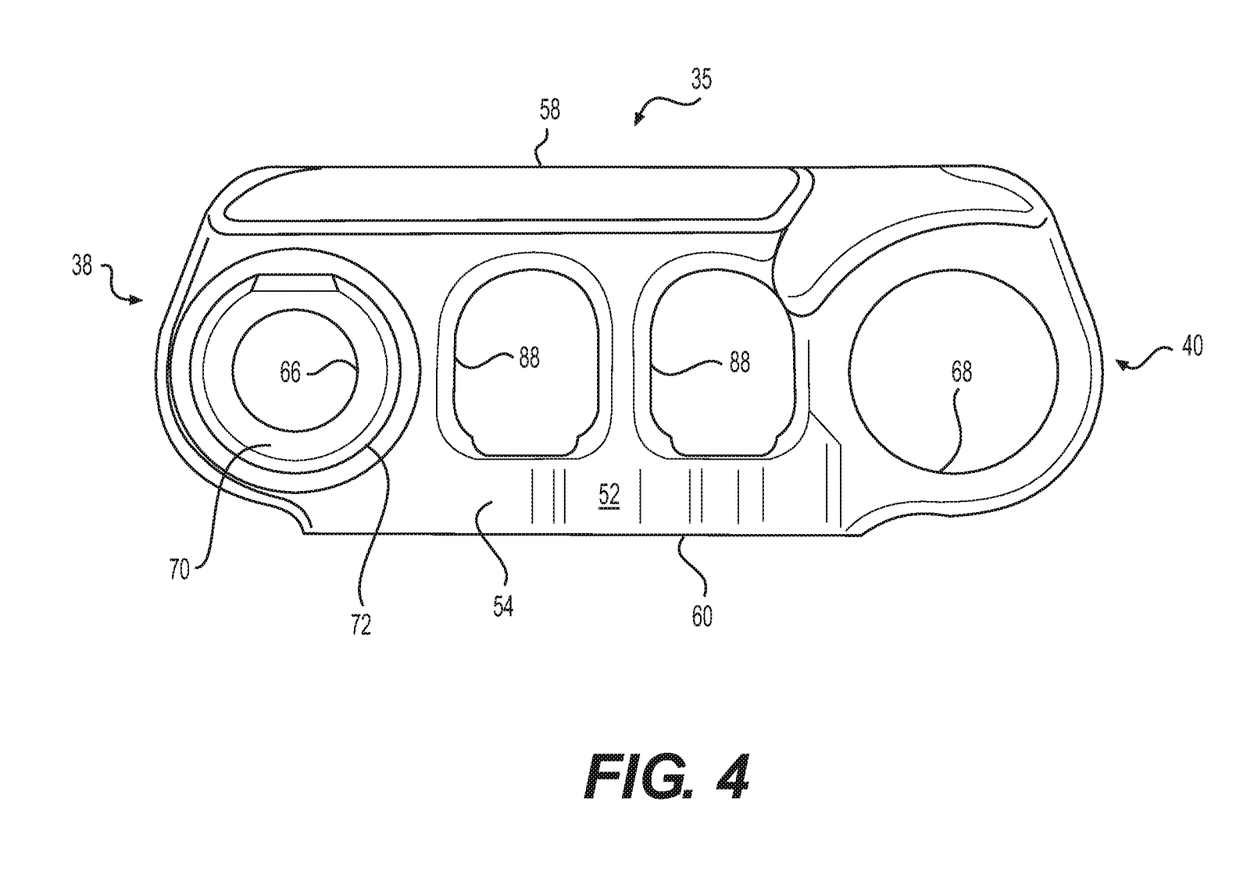
FIG. 4 is a direct side view of the track link of FIG. 3.

FIGS. 3-10 illustrate various views of track link 35 indicated in FIG. 2 and according to a disclosed embodiment. Referring first to FIGS. 3 and 4, FIG. 3 being a perspective view and FIG. 4 being a direct side view, track link 35 may include a link body 52, a first side 54, a rail surface 58, a shoe engaging surface 60, first end portion 38, and second end portion 40. Second side 56 cannot be seen in FIGS. 3 and 4 since these two figures illustrate track link 35 as viewed toward first side 54, but second side 56 may be seen in other figures to be described in detail below. First end portion 38 may include a link pin bore 66 sized and configured to receive a link pin (e.g., link pin 36 illustrated in FIG. 2), for example by a press fit connection, and second end portion 40 may include a bushing bore 68 sized and configured to receive a bushing (e.g., bushing 39 illustrated in FIG. 2), for example also by a press fit connection. In FIGS. 3 and 4, link pin boss 70 may be seen on first side 54. Link pin boss 70 may include an annular protrusion 72 surrounding link pin bore 66. Annular protrusion 72 of link pin boss 70 may vary in diameter from a diameter smaller than or approximately equal to the diameter of bushing bore 68 to a larger diameter that is greater than the diameter of bushing bore 68. Annular protrusion 72 also may be truncated along a line generally parallel to rail surface 58 as diagrammatically illustrated in FIG. 4, for example. The annular protrusion 72 of link pin boss 70 may protrude from link body 52 a distance less than 25% of the maximum thickness of link body 52 from first side 54 to second side 56.

Figure 5:
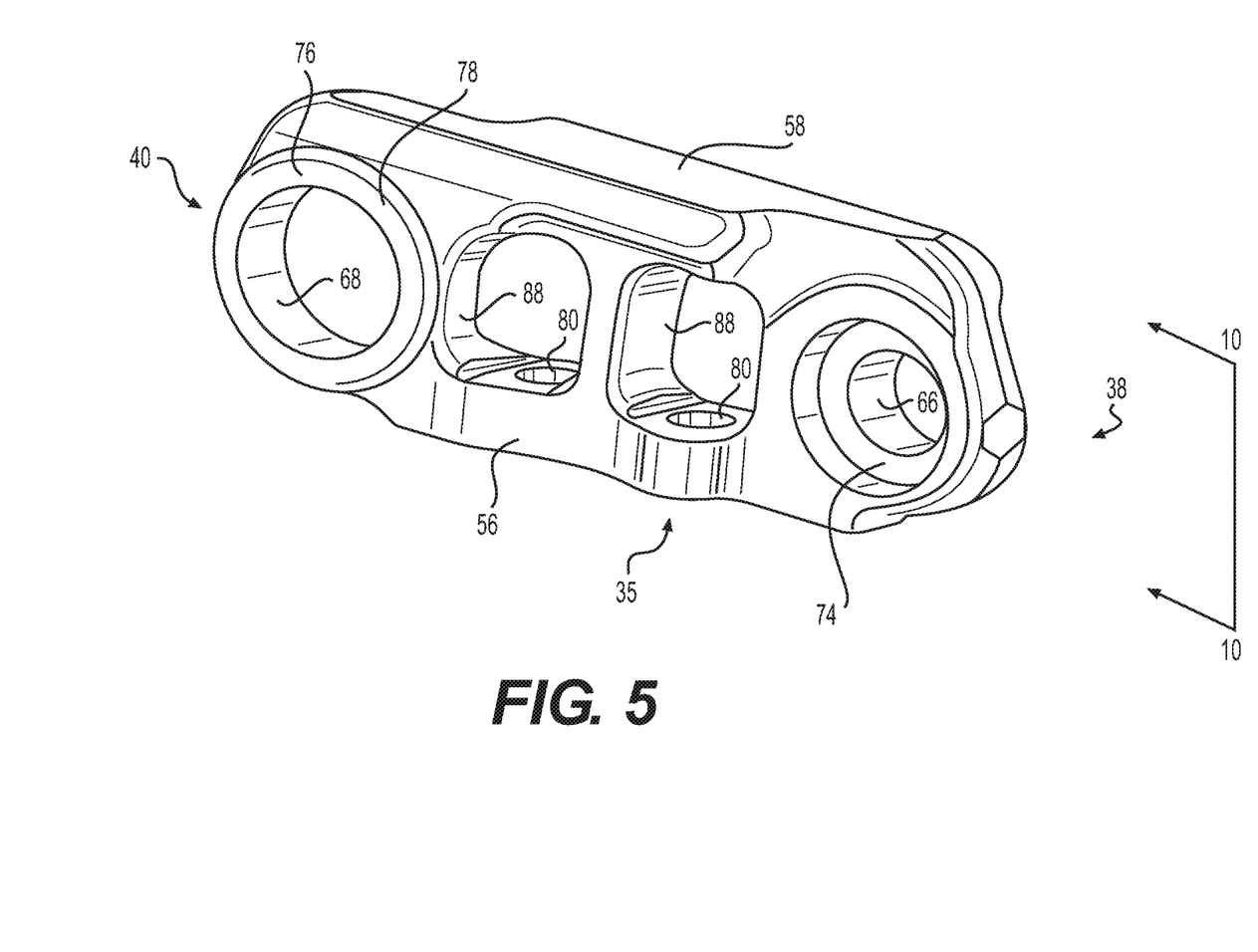
FIG. 5 is a perspective view of the track link of FIG. 3 viewed from an opposite side.
Figure 6:
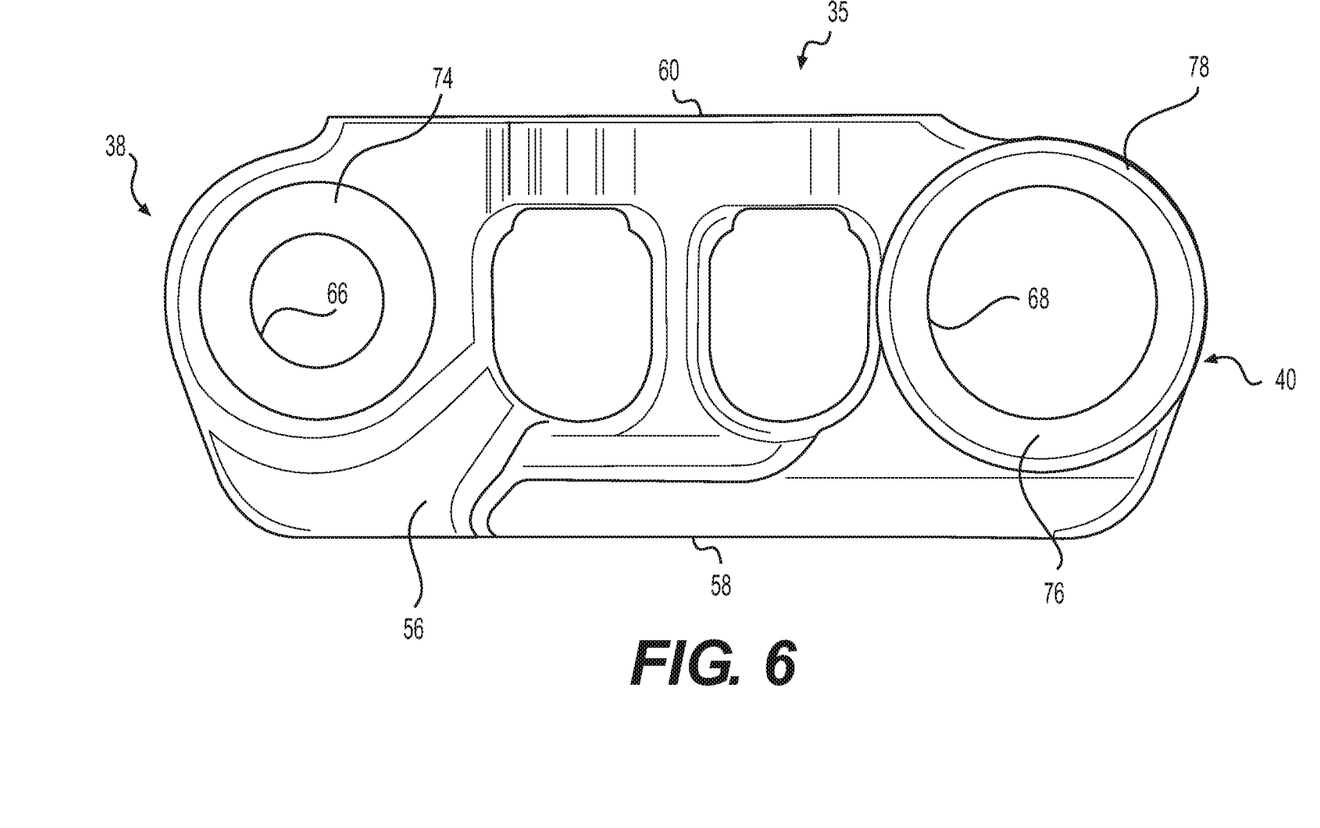
FIG. 6 is a direct side view of the track link of FIG. 5 in inverted position.

Referring to FIGS. 5 and 6, FIG. 5 being a perspective view and FIG. 6 being a direct side view, track link 35 may include second side 56. FIGS. 5 and 6 illustrate track link 35 from second side 56. First end portion 38 may include an annular recess 74 concentric to link pin bore 66 and having a diameter approximately equal to the diameter of bushing bore 68 and approximately equal to or less than the diameter of annular protrusion 72 (FIGS. 3 and 4) of link pin boss 70. Second end portion 40 may include bushing boss 76. Bushing boss 76 may include an annular protrusion 78 surrounding bushing bore 68. Rail surface 58 may be seen in FIG. 5. FIG. 6 illustrates track link 35 in an inverted position with shoe engaging surface 60 at the upper portion of FIG. 6 and rail surface 58 at the bottom of FIG. 6.

Figure 7:
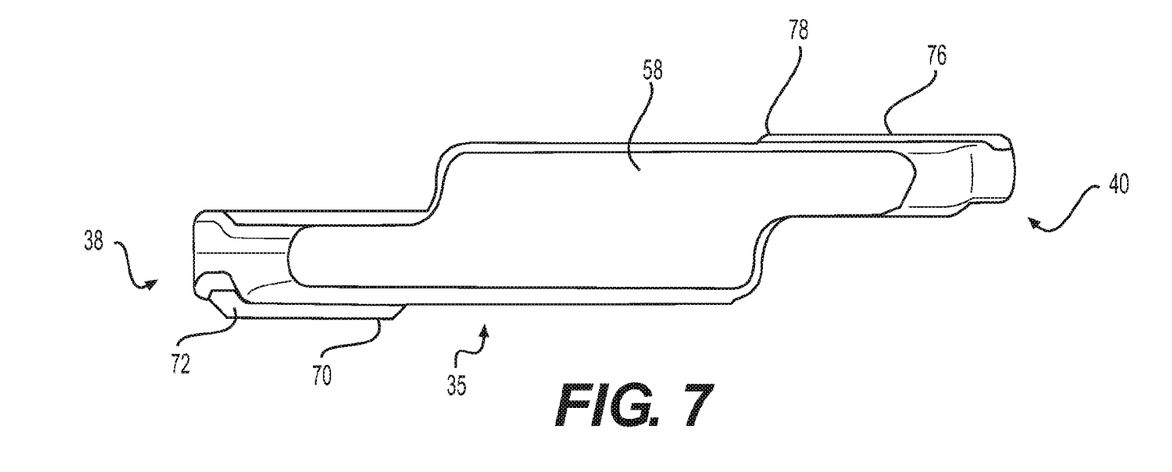
FIG. 7 is a top view of the track link of FIG. 3.

FIG. 7 illustrates track link 35 in plan. Prominent in FIG. 7 is rail surface 58. While during operation of a track-type machine the orientation of a track link 35 may change as the endless track chain 12 of machine 10 moves, rail surface 58 may be considered a top surface of track link 35. Rail surface 58 is generally planar and is configured for engagement with one or more track rollers or other guiding components associated with an undercarriage of a machine 10. FIG. 7 also illustrates first end portion 38 and link pin boss 70 including annular protrusion 72. FIG. 7 also illustrates second end portion 40 and bushing boss 76 including annular protrusion 78.

Figure 8:
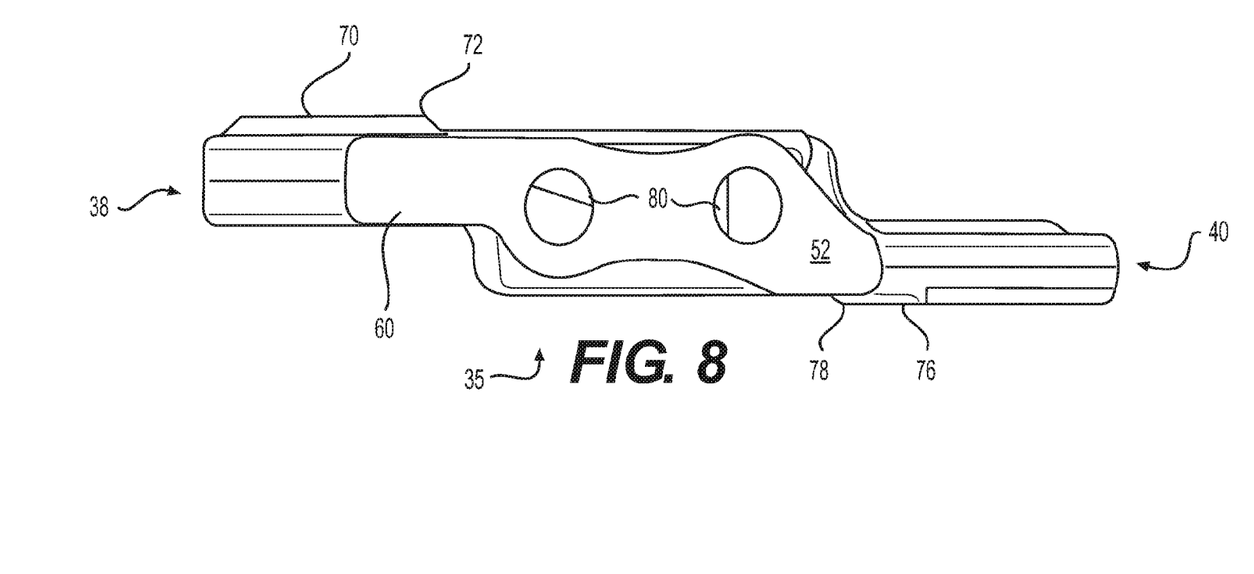
FIG. 8 is a bottom view of the track link of FIG. 3.

FIG. 8 illustrates a view of track link 35 toward shoe engaging surface 60. Shoe engaging surface 60 is a surface of link body 52 to which shoes 20 (FIG. 1) may be attached. For that purpose, one or more apertures 80 may be formed through shoe engaging surface 60. FIG. 8 also illustrates first end portion 38 and link pin boss 70 including annular protrusion 72. FIG. 8 also illustrates second end portion 40 and bushing boss 76 including annular protrusion 78.

Figure 9:
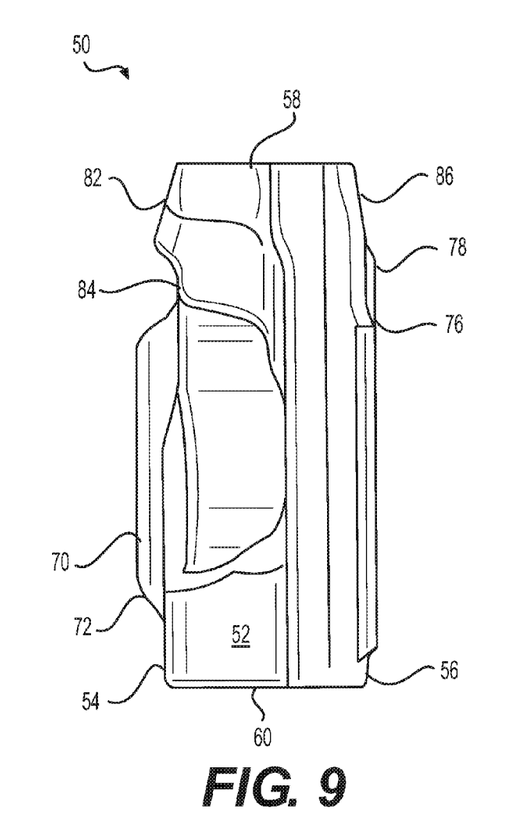
FIG. 9 is an end view of the track link of FIG. 3 and in the direction of the arrows along line 9-9 in FIG. 3.

FIG. 9 is an end view of link body 52 as viewed toward second end portion 40. FIG. 9 illustrates second side 56 and bushing boss 76 including annular protrusion 78. Also visible in FIG. 9 is first side 54 and link pin boss 70 including annular protrusion 72. FIG. 9 also includes a view on first side 54 of a first sloping portion 82 extending from rail surface 58 away from the link body 52, and a radiused transition portion 84 extending between the first sloping portion 82 and link pin boss 70. FIG. 9 also includes a view on second side 56 of a second sloping portion 86 extending from rail surface 58 toward bushing boss 76.

Figure 10:
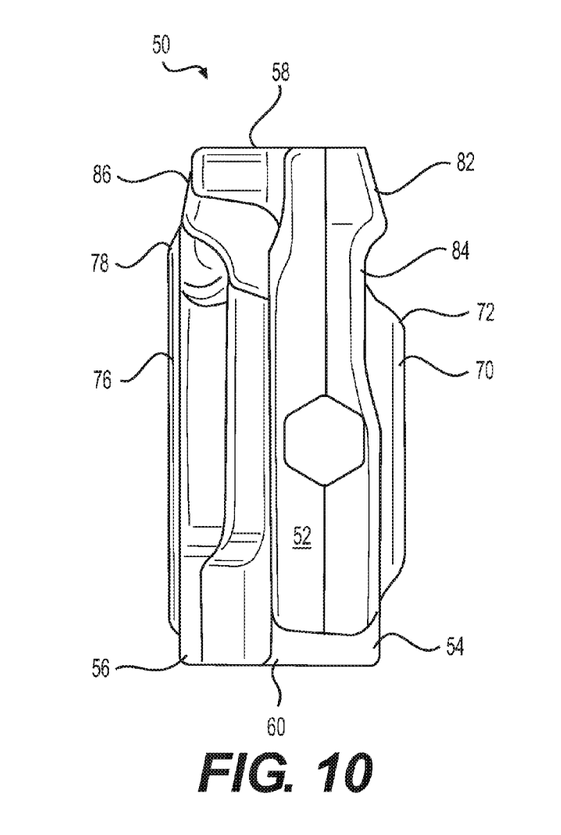
FIG. 10 is an end view of the track link of FIG. 3 and in the direction of the arrows along line 10-10 in FIG. 5.

FIG. 10 is an end view of link body 52 as viewed toward first end portion 38. FIG. 10 illustrates first side 54 and link pin boss 70 including annular protrusion 72. Also visible in FIG. 10 is second side 56 and bushing boss 76 including annular protrusion 78. FIG. 10 also includes a view on first side 54 of first sloping portion 82 extending from rail surface 58 away from the link body 52, and radiused transition portion 84 extending between first sloping portion 82 and link pin boss 70. FIG. 10 also includes a view on second side 56 of second sloping portion 86 extending from rail surface 58 toward bushing boss 76.

Referring back to FIGS. 3 and 4, for example, link body 52 may include one or more windows 88 through link body 52 sized and configured to provide access for inserting an appropriate fastener through the one or more apertures 80 in order to fasten link body 52 to one or more shoes 20. For example, the one or more windows 88 may permit a technician to insert a bolt (not shown) through an aperture 80 and may provide clearance for tightening (or loosening) the bolt via an appropriate tool.

Figure 11:
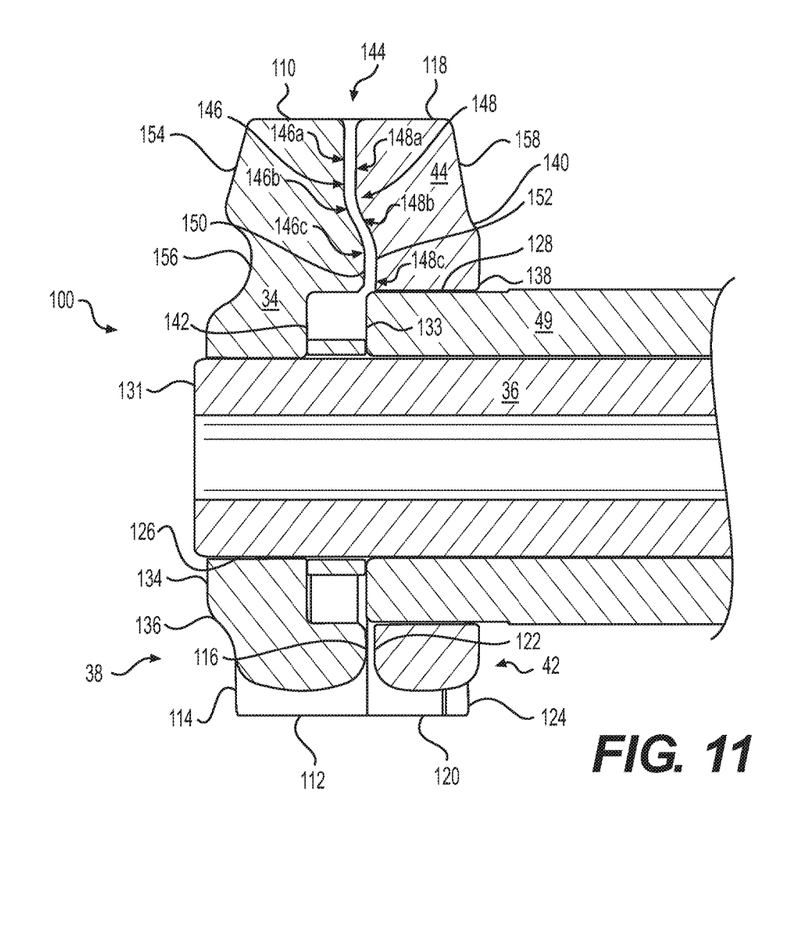
FIG. 11 is a cross-sectional view of track link structure taken at the cutaway of FIG. 2, and illustrating details of a pin joint assembly.

FIG. 11 is a cross-sectional view of a pin joint assembly 100 taken from the cutaway shown in FIG. 2. Pin joint assembly 100 includes a first link 34 and a second link 44. In FIG. 11, the cross-section illustrates a cut through first end portion 38 of first link 34, and through second end portion 42 of second link 44. However, it will be understood that first link 34 is substantially identical to second link 44 with the view of pin assembly 100 in FIG. 11 illustrating the connection of the two links at the first end portion 38 of first link 34 and the second end portion 42 of second link 44.

First link 34 may include a rail surface 110 and a shoe engaging surface 112. First link 34 also may include an outer side face 114 and an inner side face 116. Similarly, second link 44 may include a rail surface 118, a shoe engaging surface 120, an outer side face 122, and an inner side face 124. As viewed in FIG. 11, inner side face 116 at first end portion 38 of first link 34 may be mated closely to outer side face 122 of second end portion 42 of second link 44. First link 34 may include a first bore 126, and second link 44 may include a second bore 128. Link pin 36 may be secured within first bore 126 of first link 34 (e.g., by press fitting), and bushing 49 may be secured within second bore 128 of second link 44 (e.g., also by press fitting). Bushing 49 may be mounted coaxially (i.e., concentrically) around link pin 36 and rotatable relative to link pin 36 to form a pivotal connection between first link 34 and second link 44.

First link 34 may include a link pin boss 134 on outer side face 114 at first end portion 38. Link pin boss 134 may be an annular protrusion 136 around first bore 126. Second link 44 may include a bushing boss 138 on inner side face 124 at second end portion 42. Bushing boss 138 may be an annular protrusion 140 around second bore 128. As viewed in FIG. 11, an end 131 of link pin 36 may project slightly beyond link pin boss 134, and an end 133 of bushing 49 may project slightly beyond outer side face 122 of second link 44. Inner side face 116 of first link 34 may include an annular recess 142. Annular recess 142 may provide sufficient space for installing seals (not shown) configured to seal in lubricant for pin joint assembly 100 and seal out contaminants (e.g., dirt, mud, etc.). Annular recess 142 may be generally cylindrical in shape and concentric to link pin 36. Annular recess 142 also may have a diameter approximately equal to the diameter of bushing 49 and the diameter of annular protrusion 136 of link pin boss 134 around first bore 126. The lateral thickness of first link 34 from outer side face 114 to inner side face 116 between annular protrusion 136 of link pin boss 134 and annular recess 142 may be no greater than the lateral thickness of first link 34 from outer side face 114 to inner side face 116 measured adjacent rail surface 110 at first end portion 38 of first link 34.

As stated previously, inner side face 116 at first end portion 38 of first link 34 may be mated closely to outer side face 122 of second end portion 42 of second link 44. First link 34 and second link 44 include an upper portion 144 (which includes the area of first and second links 34, 44 above bushing 49 and annular recess 142). Inner side face 116 of first end portion 38 of first link 34 includes a surface portion 146 that mates with a surface portion 148 of outer side face 122 of second end portion 42 of second link 44. Mating surface portions 146, 148 include substantially planar top portions 146a, 148a extending generally perpendicularly from rail surfaces 110, 118 of first and second links 34, 44. Mating surface portions 146, 148 also may include intermediate sloping portions 146b, 148b extending from the planar top portions and sloping toward second link 44. Mating surface portion 146, 148 may further include substantially planar bottom portions 146c, 148c opposite bushing boss 138 and extending generally perpendicular to rail surfaces 110, 118 to form an offset. First end portion 38 of first link 34 also may include a raised annular portion 150 around first bore 126 and annular recess 142 on inner side face 116 of first link 34. Raised annular portion 150 is adjacent to and mates with recessed annular portion 152 around second bore 128 on outer side face 122 of second end portion 42 of second link 44. The offset mating surfaces adjacent upper portion 144 of first and second links 34, 44 coupled with an end 133 of bushing 49 projecting slightly beyond outer side face 122 of second link 44 creates an arrangement at pin joint 100 that mitigates the entry of contaminants, such as dirt, mud, etc., into the area of annular recess 142.

FIG. 11 illustrates other aspects of first end portion 38 of first link 34 and second end portion 42 of second link 44. Link 34, on outer side face 114, may include first sloping portion 154 adjacent rail surface 110, and also may include radiused transition portion 156 between first sloping portion 154 and annular protrusion 136 of link pin boss 134. Link 44, on inner side face 124, may include second sloping portion 158 between rail surface 118 and annular protrusion 140 of bushing boss 138.

As described in connection with FIG. 2, endless track chain 12 (FIG. 1) may include link sets with the links on opposite sides of the link sets being substantially mirror images of each other. Accordingly, while only pin joint assembly 100 has been described in detail, it should be understood that a companion pin joint assembly at the opposite ends of link pin 36 and bushing 49 may include features that are substantially a mirror image of those features in pin joint assembly 100.

INDUSTRIAL APPLICABILITY

The disclosed track link and pin joint assembly may be applicable to any track-type machines, such as, for example, tractors, dozers, and other excavating and/or material handling machines. The disclosed track joint assemblies may have various advantages over prior art track joint assemblies. Referring to FIG. 11, for example, link pin boss 134 is provided at one end of a track link for giving sufficient material surface within first bore 126 to maintain a secure press fit connection between link pin 36 and link 34. However, the lateral extent of link pin boss 134 is substantially reduced relative to typical arrangements where the lateral extent of the link pin boss extends substantially further and has the disadvantage of tending to scrape against track guiding structures in the machine undercarriage. Reduction in the lateral extent of the link pin boss is made possible without compromising the integrity of the press fit connection between the link pin 36 and the link 34 by providing a bushing boss on a mating track link. The reduction in material on the outside of a track chain due to a link pin boss of reduced length, is compensated by an addition of material on the inside of the track chain in the form of a bushing boss. The combination of a reduction in laterally extending material outside the pin joint assembly coupled with an increase in material toward the inside of the pin joint assembly results in a strong pin joint assembly and a track chain that is narrowed relative to prior art assemblies with long pin bosses.

Other advantages accrue from the disclosed embodiments of a pin joint assembly. Referring to FIG. 11, for example, the mating surfaces 146, 148 at upper portion 144 of track links 34, 44 deviate from a straight path. In addition, end 133 of bushing 49 extends slightly beyond outer side face 122 toward annular recess 142. Along with seals (not shown) installed in annular recess 142, the non-straight path created by the mating surfaces 146, 148 and the extension of bushing 49 help insure against ingress of contaminants (e.g., mud) into the pin joint assembly where it could contaminate lubricant material and abrade and damage the joint.

By reducing pin boss length and thereby allowing the overall width of the track chain structure to be reduced so that the track chain will not contact and scrape against undercarriage guiding structure, all track chain guiding may then be done via the rail surface of the track chain links. The additional material added to each link in the form of the bushing boss compensates for the reduction of material in the pin boss and insures that there is enough surface area around the pin and bushing bores to maintain a strong press fit connection at each joint assembly.

It will be apparent to those skilled in the art that various modifications and variations can be made to the disclosed track link structure and pin joint assembly. Other embodiments will be apparent to those skilled in the art from consideration of the specification and practice of the disclosed embodiments of a track link structure and a pin joint assembly. It is intended that the specification and examples be considered as exemplary only, with a true scope being indicated by the following claims and their equivalents.

What is claimed is:

1. A track link, comprising:
    a link body having first and second sides, a rail surface, a shoe engaging surface, and first and second end portions;
    a link pin bore at the first end portion configured to receive a link pin;
    a bushing bore at the second end portion configured to receive a bushing;
    a link pin boss located at the first end portion on the first side, surrounding the link pin bore, and including an annular protrusion on the first side of the link body;
    an annular recess on the second side of the link body and on the first end portion opposite the annular protrusion of the link pin boss, the annular recess having a diameter approximately equal to the diameter of the bushing bore and approximately equal to or less than the outer diameter of the annular protrusion of the link pin boss;
    wherein the link body has a first lateral thickness and a second lateral thickness, the first lateral thickness extending from an outermost surface of the first side to an outermost surface of the second side and from an outermost end of the annular recess to an outermost end of the annular protrusion of the link pin boss and being measured at the link pin bore, and the second lateral thickness extending from the outermost surface of the first side to the outermost surface of the second side and being measured at the rail surface at the first end portion of the link body;
    wherein the first lateral thickness is less than or equal to the second lateral thickness;
    a bushing boss located at the second end portion on the second side and surrounding the bushing bore, and including a second annular protrusion on the second side of the link body; and
    a third protrusion located on the second side of the link body opposite the annular protrusion of the link pin boss, the third protrusion at least partially surrounding the link pin bore and the annular recess.

2. The track link of claim 1, wherein the rail surface is generally planar and is configured for engagement with one or more guiding components.

3. The track link of claim 1, wherein the shoe engaging surface includes at least one aperture and is configured to support a track shoe.

4. The track link of claim 3, further comprising at least one access window extending through the link body and configured to provide access for attaching at least one fastener through the at least one aperture.

5. The track link of claim 1, wherein:
    the first side of the link body on the first end portion includes a first sloping portion extending from the rail surface away from the link body, and a radiused transition portion extending between the first sloping portion and the link pin boss; and
    the second side of the link body on the second end portion includes a second sloping portion extending from the rail surface toward the bushing boss.

6. The track link of claim 1, wherein the first side of the link body on the second end portion includes a substantially planar top portion extending generally perpendicularly from the rail surface, an intermediate sloping portion extending from the top portion toward the second side of the link body on the second end portion, and a substantially planar bottom portion extending to the bushing bore.

7. The track link of claim 1, wherein the second side of the link body on the first end portion includes a substantially planar top portion extending generally perpendicularly from the rail surface, an intermediate sloping portion extending from the top portion away from the first side, and a raised annular portion around an annular recess.

8. A pin joint assembly, comprising:
    a first link having a rail surface, a shoe engaging surface, an outer side face, an inner side face, and a first bore extending through a first end portion of the first link;
    a second link having a rail surface, a shoe engaging surface, an outer side face, an inner side face, and a second bore extending through a second end portion of the second link, the first and second bores being axially aligned;
    a link pin positioned within and press-fitted in the first bore;

a bushing positioned coaxially around the link pin and extending through the second bore and beyond the outer side face of the second link, the bushing being press-fitted in the second bore;
a link pin boss on the outer side face of the first link;
a bushing boss on the inner side face of the second link that includes an annular protrusion on the inner side face of the second link;
wherein the first end portion of the first link includes a raised annular portion around the first bore on the inner side face of the first link, adjacent to and mating with a recessed annular portion on the outer side face of the second link and on the second end portion of the second link and around the second bore;
wherein a surface portion of the inner side face of the first link on the first end portion of the first link mates with a surface portion of the outer side face of the second link on the second end portion of the second link, and wherein the mating surface portions extend generally perpendicularly from the rail surfaces of the first and second links, then slope towards the second link, then extend generally perpendicularly away from the rail surfaces to form offset mating surfaces adjacent an upper portion of the first and second links;
wherein the first link has a first lateral thickness and a second lateral thickness, the first lateral thickness extending from an outermost surface of the outer side face to an outermost surface of the inner side face and from an outermost surface of the annular protrusion to an outermost surface of the annular recess and being measured at the first bore, and the second lateral thickness extending from an outermost surface of the outer side face to an outermost surface of the inner side face and being measured at the rail surface at the first end portion of the first link; and
wherein the first lateral thickness is less than or equal to the second lateral thickness.

9. The pin joint assembly of claim 8, wherein the link pin boss is an annular protrusion around the first bore.

10. The pin joint assembly of claim 8, wherein the recessed annular portion on the outer side face of the second link and on the second end portion of the second link has a diameter approximately equal to the diameter of the annular protrusion around the second bore.

11. The pin joint assembly of claim 8, further including an annular recess on the inner side face of the first link concentric to the link pin and having a diameter approximately equal to the diameter of the bushing.

12. A pin joint assembly, comprising:
a first link having first and second end portions, a rail surface, a shoe engaging surface, and inner and outer side faces, and a second link having first and second end portions, a rail surface, a shoe engaging surface, and inner and outer side faces;
a first bore extending through the first end portion of the first link;
a second bore extending through the second end portion of the second link, the first and second bores being axially aligned;
a pivotal connection between the first and second links including a link pin positioned within the first bore, and a bushing coaxially around the link pin and positioned within the second bore;
a link pin boss on the outer side face of the first link, including an annular protrusion around the first bore on the outer side face of the first link;
a bushing boss on the inner side face of the second link, including an annular protrusion around the second bore on the inner side face of the second link;
a second protrusion located on the inner side face of the first link opposite the annular protrusion of the link pin boss, the second protrusion at least partially surrounding the first bore;
an annular recess on the inner side face of the first link concentric to the link pin, the second protrusion at least partially surrounding the annular recess, and the annular recess having a diameter approximately equal to the diameter of the bushing and approximately equal to or less than the diameter of the annular protrusion around the first bore;
wherein the first link has a first lateral thickness and a second lateral thickness, the first lateral thickness extending from an outermost surface of the outer side face to an outermost surface of the inner side face and from an outermost surface of the annular protrusion of the link pin boss to an outermost surface of the annular recess and being measured at the first bore, and the second lateral thickness extending from an outermost surface of the outer side face to an outermost surface of the inner side face and being measured at the rail surface at the first end portion of the first link; and
wherein the first lateral thickness is less than or equal to the second lateral thickness.

\* \* \* \* \*